M. CORNINE.
INDICATING DEVICE.
APPLICATION FILED APR. 5, 1912.

1,118,186.

Patented Nov. 24, 1914.
2 SHEETS—SHEET 1.

Attest:

Inventor:
Marshall Cornine
by
Atty

M. CORNINE.
INDICATING DEVICE.
APPLICATION FILED APR. 5, 1912.

1,118,186.

Patented Nov. 24, 1914.
2 SHEETS—SHEET 2.

Attest:

Inventor:
Marshall Cornine
by
Atty

UNITED STATES PATENT OFFICE.

MARSHALL CORNINE, OF MOUNT VERNON, NEW YORK.

INDICATING DEVICE.

1,118,186.        Specification of Letters Patent.      Patented Nov. 24, 1914.

Application filed April 5, 1912. Serial No. 688,655.

*To all whom it may concern:*

Be it known that I, MARSHALL CORNINE, a citizen of the United States of America, residing at Mount Vernon, in the county of Westchester and State of New York, have invented certain new and useful Improvements in Indicating Devices, of which the following is a specification.

My invention relates to indicating devices and particularly to an indicating device adapted to be placed upon a gas meter, to be engaged with the mechanism intervening between the bellows and the index, to indicate the movement of that mechanism, particularly what is known as the tangent, and yet to be adapted to be used without opening the meter so much as would permit the changing of the regulating device.

Figure 1:
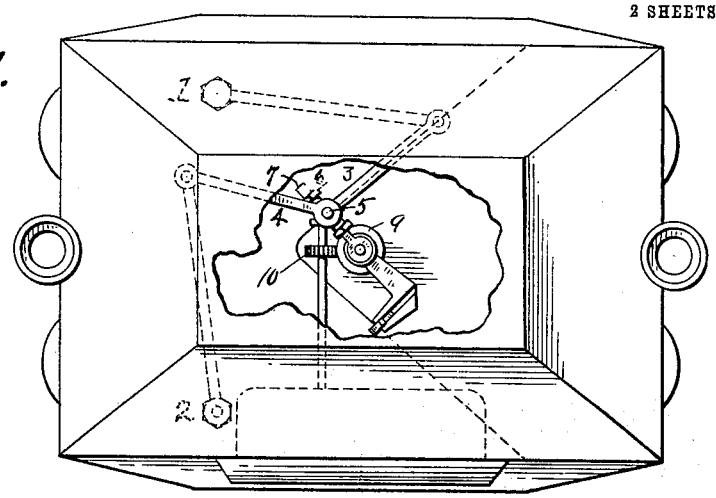
Figure 2:
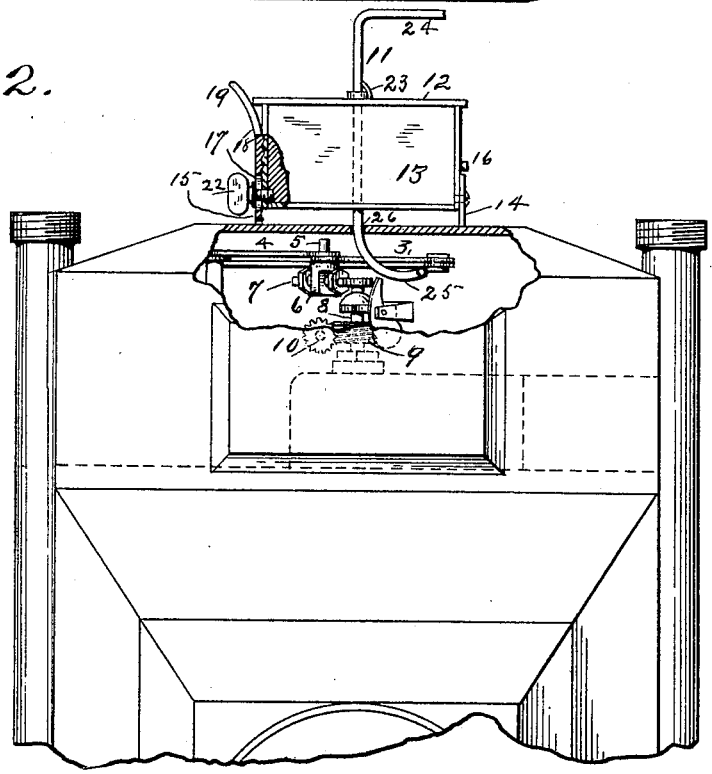
Figure 3:
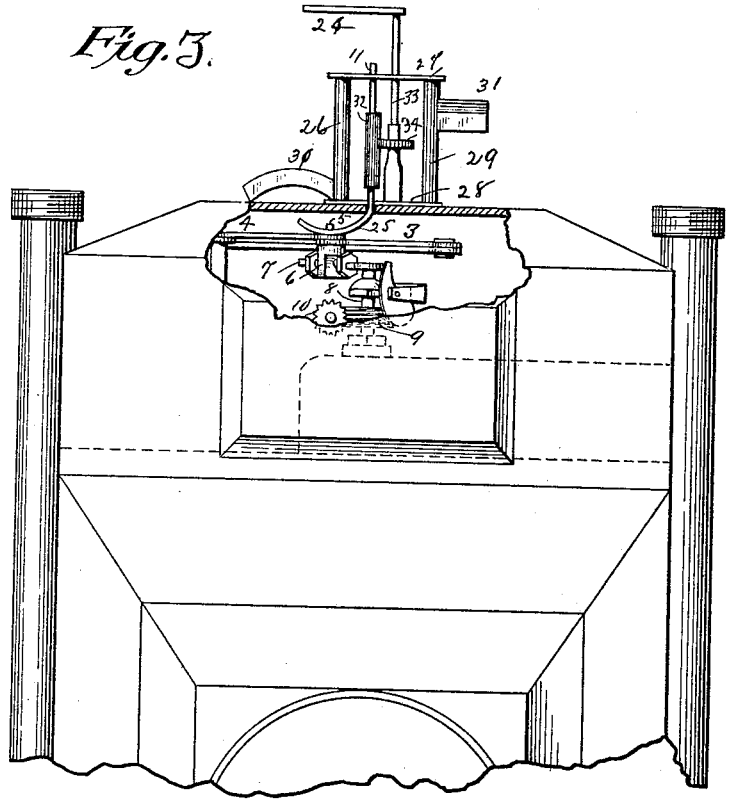
Figure 4:
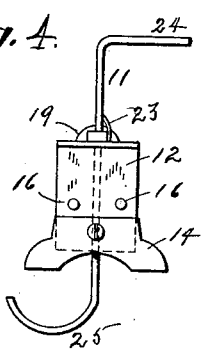
Figure 5:
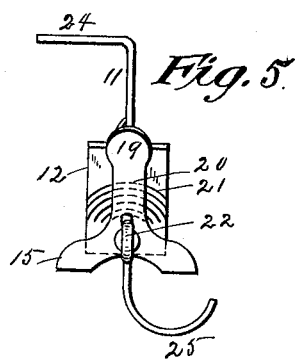

Figure 1 is a plan view of the mechanism intervening between the bellows and the index of a meter. Fig. 2 is a side view partly in section of a device embodying my invention, so set upon a meter that its operating crank will be engaged by the said meter operating mechanism. Fig. 3, is a similar view of a modified form of such a device, showing the parts in the positions which they occupy, when the shaft of the indicator has been raised by the movement of the flag-arm levers. Figs. 4 and 5, are detail views.

Very many meters are provided with flag wires such as 1, 2, linked to the bellows and caused to oscillate upon the filling and exhaustion of those bellows, consequent upon the passage of gas through them and it is this movement, (communicated to the index by means of jointed flag arms 3, 4, pivoted to a post or bat 5, mounted upon a sleeve 6, which is threaded upon a tangent or arm 7, extending from the crank shaft 8,) which I desire to observe. The crank shaft carries a worm 9, meshing with an index shaft gear 10, connected to the index shaft.

It will be manifest to the observer that if there is the slightest lost motion between the worm and gear of the indicating mechanism, that a single revolution of the tangent might not be sufficient to determine by merely observing the index on the face of the meter whether the quantity of gas passed through the meter was actually registered upon the index, because the lost motion, on so slight a movement, might result in not showing that a full revolution of the tangent had actually taken place. Many meters are so geared that it requires 16 revolutions (and some 18) of the tangent, to pass two feet of gas through the meter, consequently one revolution of the tangent would move the index finger of the meter, so slightly as to render it almost impossible to determine whether it was registering correctly or not. If the tester is compelled to pass a number of cubic feet of air or other gas through the meter, in order to determine whether it registers correctly or not, the time taken is so great that the labor charge for testing is correspondingly great. Now if the top were off, then the movement of the tangent could be observed, and if upon one revolution of that tangent 216 cubic inches of gas passed (if geared for 16 revolutions) or 192 cubic inches of gas passed (if geared for 18 revolutions), it would indicate that the meter was properly adjusted. But with the top of the meter on, the movement of the tangent cannot be observed. Taking off the top involves time and labor and the necessity for resealing by the inspector, after it is replaced. A sight opening might be provided, but if that is large enough to answer the purpose for permitting the movement of the tangent to be clearly observed it is large enough to cause the inspector to insist on a new inspector's test and sealing.

My invention is devised to meet the condition named. It consists first of a rotary shaft of comparatively fine wire, a frame or other support, preferably weighted to keep it automatically in place, a crank arm or piece extending from or secured to the shaft, a stop limiting its downward movement and an indicator secured to its upper part.

In the preferred form, I use a rotary shaft 11, carried vertically in a frame 12 inclosing a block of lead, 13, for the weight. The frame is preferably provided with pivoted foot pieces 14, 15, one pivoted to one end of the frame, (as shown) stop pins 16, being provided to prevent it from turning entirely around. When the device is set upon the top of a meter, the frame can be easily swung to a position which will bring the shaft upright, by reason of the pivots on which it may turn.

The foot piece 15, is preferably provided with a slot 17, an upwardly extending shank 18, and a thumb piece 19, and its inner face and the outer face of the adjacent member of the frame are scored, in curved lines, as shown at 20, 21 the material having sufficient spring and the pivot 22, being sufficiently tight to hold the frame in given positions. Now when the foot pieces are set upon a meter, if the shaft 11 inclines forward or backward, the thumb piece may be pushed one way or the other until the frame reaches the proper position, where it will remain, held by the friction between it and the shank of the piece 15, 19. If the shaft 11 is laterally out of plumb, the thumb piece is pressed outward releasing the projections on piece 15, 19 from those on frame 12 and the frame is raised or lowered till the shaft 11 stands upright. Then the thumb piece is released and the proper position is maintained. In a majority of instances it will seat itself correctly without manipulation, but if any is needed, the means provided permit it to be very quickly and easily made.

The shaft 11 has a spring stop 23, consisting of a sleeve with a spring finger which bears against the shaft. At or near its upper end, shaft 11 carries or is connected with a pointer 24, and below the frame, it is provided with a crank 25. The crank 25 is preferably curved as shown but I do not limit myself to a curved crank.

The operation of the tester is as follows: A fine hole is punched in the top of the meter, as at 26, and the crank 25 is inserted in the hole and passed down until the device is in the position shown in Fig. 2 with the crank as low as the tangent; the hole being punched directly over the top of the crank shaft 8. Now the bellows are operated and the tangent will begin to turn, and as soon as it strikes against the crank 25, the shaft 11 and pointer 24 will begin to turn. The operation of the bellows is continued and when the indicator again comes to the position it occupied when shaft 11 began to turn, we know that the tangent has made one complete revolution and can calculate accordingly, without having removed the cover or made so large an opening as to necessitate retesting and resealing by the inspector. But the tangents of some meters are set higher than those of others, and, with some, the crank would lock with one or the other of the flag arms and prevent further motion. To meet this difficulty I incline the crank, so that when it is engaged by either flagarm, that arm acting against the inclined face of the crank will force that upward, its weight being very slight, until the crank rests upon and rides on the top of the flag arm. It will then be carried up against the bat of the tangent, and then further movement of the tangent will carry the crank with it, rotate shaft 11 and turn the pointer, whose movement may be observed as already mentioned.

The stop 23, which may be shifted up or down, to any desired location, prevents the shaft 11 from sliding down so far as to cause the pointer to engage the frame and interfere with the operation of the indicator.

In Fig. 3, I show the device as I arrange it when I desire to have the pointer make but one revolution while the tangent makes 4. In that case I mount a pinion 32 of 6 teeth upon the shaft 11, and mount the indicator upon a counter shaft 33 provided with a gear 34 with 24 teeth. It will be readily understood that the crank of shaft 11 will be engaged and turned exactly as before, but that the indicator will only be turned once while the tangent 9 and consequently the shaft 11 is turning four times. In this figure I have also shown a modified form of the frame 26, 27, 28, 29 and of the weights 30, 31, employed to hold it in position, but their purpose and operations are so plain as to need no detailed description.

This device though simple is of great utility inasmuch as it saves the labor of removing the covers from thousands of meters, which are required to be tested periodically, but need no adjustment because they are found to register correctly. If adjustment is found necessary, the cover can be unsoldered and removed and the adjustment made in the ordinary manner.

What I claim as my invention and desire to secure by Letters Patent, is—

1. An indicator composed of a portable frame adapted to support an upright shaft therein and to permit it to turn in said frame, a shaft supported in said frame adapted to rotate on its axis and to have its lower end, inserted in a small orifice in a meter and provided at its lower end and beyond the frame with a crank free to make a complete revolution, and above its bearing with a pointer.

2. An indicator composed of a portable frame adapted to support an upright shaft therein, and to permit it to turn in said frame; a shaft supported in said frame, adapted to rotate on its axis and to have its lower end, inserted in a small orifice in a meter and provided at its lower end and beyond the frame with a crank free to make a complete revolution set at an angle, other than a right angle to the shaft, and above its bearing with a pointer.

3. An indicator composed of a portable frame, adapted to support an upright shaft therein, and to permit it to turn in said frame, a shaft supported in said frame adapted to rotate on its axis and to have its lower end, inserted in a small orifice in a meter and provided, at its lower end and beyond the frame, with a crank free to make a complete revolution extending in a curved line from said shaft and above its bearing with a pointer.

4. An indicator composed of a portable frame, adapted to support an upright shaft therein and to permit it to turn in said frame, a shaft, adapted to rotate on its axis, supported in said frame, adapted to have its lower end inserted in a small orifice in a meter and provided at its lower end and beyond the frame with a crank free to make a complete revolution, a second shaft also supported in said frame and provided, above its bearings, with a pointer, together with a multiplying gear intervening between the two shafts.

5. An indicator composed of a portable frame adapted to support an upright shaft therein and to permit it to turn in said frame, a shaft supported in said frame adapted to rotate on its axis and to have its lower end, inserted in a small orifice in a meter and provided at its lower end and beyond the frame with a crank free to make a complete revolution, and above its bearing with a pointer, and a stop limiting the downward movement of said upright shaft.

6. An indicator composed of a portable frame adapted to support an upright shaft therein and to permit it to turn in said frame, a shaft supported in said frame adapted to rotate on its axis and to have its lower end, inserted in a small orifice in a meter and provided at its lower end and beyond the frame with a crank free to make a complete revolution, and above its bearing with a pointer, and an adjustable stop limiting the downward movement of said upright shaft.

7. An indicator composed of a frame adapted to support an upright shaft therein and to permit it to turn in said frame, a shaft supported in said frame adapted to rotate on its axis and to have its lower end, inserted in a small orifice in a meter and provided at its lower end and beyond the frame with a crank free to make a complete revolution, and above its bearing with a pointer, and a weight adapted to hold the frame in position.

8. An indicator composed of a frame adapted to support an upright shaft therein and to permit it to turn in said frame, a shaft supported in said frame adapted to rotate on its axis and to have its lower end, inserted in a small orifice in a meter and provided at its lower end and beyond the frame with a crank free to make a complete revolution, and above its bearing with a pointer said frame being provided with pivoted legs.

9. An indicator composed of a frame adapted to support an upright shaft therein and to permit it to turn in said frame, a shaft supported in said frame adapted to rotate on its axis and to have its lower end, inserted in a small orifice in a meter and provided at its lower end and beyond the frame with a crank free to make a complete revolution, and above its bearing with a pointer, said frame being provided with a pivoted leg and a leg which is pivoted and slotted.

10. An indicator composed of a frame adapted to support an upright shaft therein and to permit it to turn in said frame, a shaft supported in said frame adapted to rotate on its axis and to have its lower end, inserted in a small orifice in a meter and provided at its lower end and beyond the frame with a crank free to make a complete revolution, and above its bearing with a pointer and provided with legs, pivoted to the frame and one of which is provided with a thumb piece.

11. An indicator composed of a frame adapted to support an upright shaft therein, and to permit it to turn in said frame, a shaft supported in said frame adapted to rotate on its axis and to have its lower end, inserted in a small orifice in a meter and provided at its lower end and beyond the frame with a crank free to make a complete revolution and above its bearing with a pointer, said frame being provided with pivoted legs one of which is provided with an extension of spring material having a thumb piece, and projections upon the frame and the thumb piece adapted to engage each other as set forth.

12. An indicator composed of a frame provided with pivoted legs and projections at one side, which frame is adapted to support an upright shaft therein and permit it to turn in said frame, a shaft supported in said frame adapted to rotate on its axis and to have its lower end, inserted in a small orifice in a meter, and provided at its lower end and beyond the frame with a crank free to make a complete revolution extending from said shaft in a curved line, pivoted legs, one of which is provided with a shank of spring material and a thumb piece, said shank being provided with projections adapted to engage the projections upon the frame, and a pointer connected to said shaft above its bearing, all substantially as set forth.

In testimony whereof, I have signed my name to this specification in the presence of two subscribing witnesses, this 28" day of March 1912.

MARSHALL CORNINE.

Witnesses:
H. M. VERMILYA,
A. G. N. VERMILYA.